Oct. 19, 1965

J. H. IRVIN 3,212,209

FISH LURE

Filed July 6, 1964

INVENTOR.
JOHN H. IRVIN
BY
*Irvine and Smiley*
ATTORNEYS ically change the shape of the skirt, or the appearance

United States Patent Office 3,212,209
Patented Oct. 19, 1965

3,212,209
FISH LURE
John H. Irvin, Vero Beach, Fla., assignor to Nickelure Line Inc., Vero Beach, Fla., a corporation of Florida
Filed July 6, 1964, Ser. No. 380,343
9 Claims. (Cl. 43—42.28)

This invention relates to an improved fish lure, of the type having a skirt-like tail surrounding a hook and simulating an insect, in which the improvement embodies the addition of a movable member on the shank of the hook engaging the skirt to vary the flare, thereby changing the appearance of the lure.

A vast variety of lures are available to game fishermen. These provide attractive fish bait by reason of appearance (size, shape and color) and movement, or action as the line to which the lure is tied is drawn through the water. Thus appearance of the lure is an important factor in the attractiveness of the lure. Unfortunately, different species of fish are attracted to differently appearing lures, and frequently the same species of fish at different times prefer to strike at different lures. Therefore, it is necessary for a game fisherman to carry many lures of different appearance if he is to succeed in catching fish.

The present invention reduces the number of lures necessary to be carried by a fisherman, in providing a lure whose appearance can be radically changed quickly by merely moving one small component part. To this end the lure may be formed in a conventional manner having a hook with a shank, a head of lead, or other material, molded or otherwise secured on the shank, and a tail, or skirt, of fibers surrounding the shank and secured to the head. Combined with these conventional parts, a collar, or other suitable element, is mounted for movement along the shank to engage the interior of the skirt at different points. Movement of the collar toward the head to a new position, where it is frictionally retained, increases the flare of the skirt thus materially changing the appearance of the lure. Movement of the collar away from the head correspondingly decreases the skirt flare.

Thus, it is a primary object of the invention to provide an improved fish lure, of the above described characteristics, having movable means for quickly and easily changing the size, shape and appearance of the lure to simulate a different insect, or creature, with each different setting of said movable means.

It is another object of the invention to provide a fish lure having a skirt-like tail of fiberous material surrounding a hook and provided with means movable along the shank of the hook to vary the flare of the tail.

It is another object of the invention to provide an improved fish lure, of the above described characteristics, in which the improvement involves only the addition of a single, inexpensive collar slideable along the shank of the lure hook.

Still another object of the invention is to provide a fish lure of the above described characteristics which is formed of few parts of simple construction, which is easy and inexpensive to fabricate, and easy to use.

Yet another object of the invention is to provide a fish lure, which comprises merely a hook, a collar assembled on the shank of the hook by sliding over the hook, and a tail, or skirt, of fiber-like elements tied, or otherwise secured, to the collar.

A further object of the invention is to provide a fish lure wherein the lure hook is provided with two collars, the first collar having a tail skirt secured thereto, the second and larger collar being mounted on the shank of the hook intermediate the hook and the first collar, and at least one of said collars being movable to change the flare of the skirt.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Figure 1:
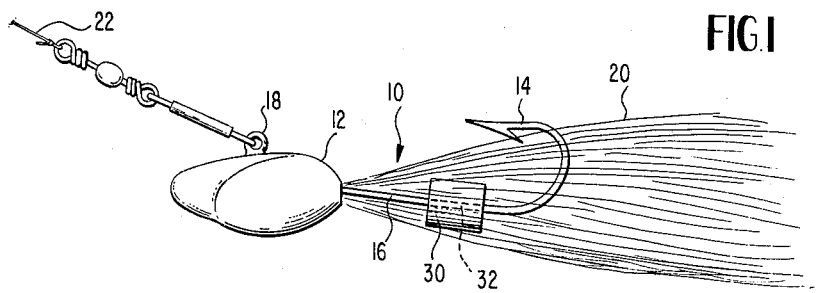
FIG. 1 is a side elevation of a fish lure constructed in accordance with the invention.
Figure 2:
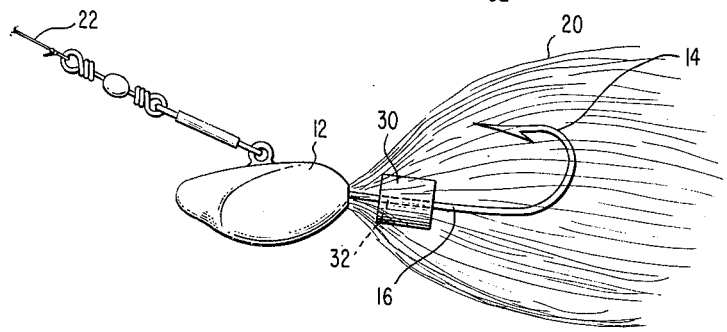
FIG. 2 is an elevational view similar to FIG. 1 in which the movable collar has been adjusted to flare the skirt outwardly to a considerable extent.
Figure 3:
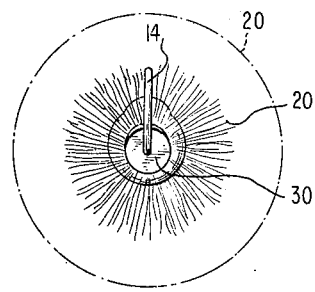
FIG. 3 is an end elevation taken from the hook end of FIG. 1 and showing the flared condition of the skirt of FIG. 2 in broken lines.

Referring now more particularly to FIGS. 1–3 of the drawings, a fish lure 10, according to the invention is shown as comprising a head 12 fixed to the shank 16 of the fish hook 14. A skirt 20 is secured at one end to the head 12 and surrounds the shank of the fish hook. The head is provided with an eye 18 for securement of connecting means to the finishing line 22.

In the illustrated embodiment the head 12 is cast of lead, or other material, about the end of shank 16 and is painted, enameled, or otherwise coated with a surface of pleasing color and appearance which will not tarnish even in a sea water environment.

The skirt 20 comprises a plurality of fiber-like elements formed of nylon, chenille, wool or cotton, or of buck tail, calf tail, bear hair, feathers, or the like. The skirt fibers are also suitably colored to present a bright, pleasing appearance. They are each integrally molded at one end in the head, and at least partially surround the shank 16 and extend beyond the hook end 14 to give the lure, as it is drawn through the water, the appearance of a moving insect, or creature.

As thus far described the lure is conventional and the head, hook and skirt may all vary in size, shape and color. To the described conventional lure is added a collar 30 of tubular shape having an axial bore 32 approximately the same size as the diameter of the shank 16, or slightly smaller. Preferably the collar is formed of a synthetic, or natural, highly resilient, plastic material, as for example, a resilient plastic or rubber. Formed of such material, the collar may be slipped over the hook end 14 to the position shown in FIG. 1, the bore 32 expanding to accommodate the thick hook end 14 and then, because of its inherent resiliency, retracting to its original size to frictionally clamp the shank 16.

When, by finger pressure, the collar 30 is shifted along shank 16 toward or away from the head 12, the friction of the shank in the bore of the collar is overcome and the collar slides along the shank to any desired position where it remains held by friction.

As thus assembled, and in the position illustrated in FIG. 1, the collar 30 is inside the skirt 20 and although engaging some of the fibers of the skirt 20 does not materially change the shape of the skirt, or the appearance of the lure. The outer diameter of callar 30 is selected to be larger than the diameter of the skirt 20 at the neck portion which is secured to the head 12. If then the collar 30 is moved along shank 16 to the position shown in FIG. 2, the head end of the collar, engaging the inner fibers of skirt 20, will push them outwardly away from the shank changing the flare of the skirt, and changing the appearance of the lure from the rough cylinder shape of FIG. 1 to the much larger and somewhat conical shape of FIG. 2. It is apparent, therefore, that by a relatively quick and easy movement imparted to collar 30 by a fisherman, the fish lure may be radically changed in size and shape thereby changing its appearance, so that, for example, upon finding a particular game fish is not striking the lure when in the condition of FIG. 1, the same type of fish may more readily strike at the lure having the appearance of a different insect of FIG. 2. Obviously, the collar may be moved toward head 12 until its leading edge engages the neck of the head to further extend and increase the size of the skirt 20, or the collar may be moved in the opposite direction to reduce the size and flare of the skirt. In any selected position the collar remains stationary on the shaft 16 due to the friction between the shaft and the surface of bore 32.

Figure 4:
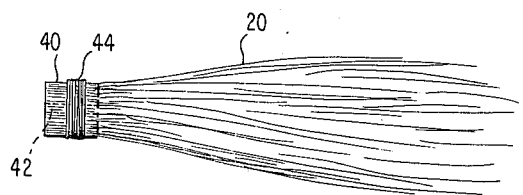
FIG. 4 is a side elevation of a modified embodiment of the invention in which the skirt is attached to the slideable collar.
Figure 5:
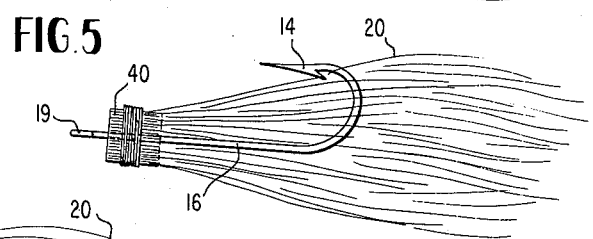
FIG. 5 is a side elevation of the skirt and collar of FIG. 4 assembled on a hook to form a lure.

In the modified embodiment of the invention illustrated in FIGS. 4 and 5, the head of the lure is constituted by a collar 40 which may be formed of the same resilient material as described for collar 30 and may be of approximately the same size, larger, or smaller, if desired. The collar 40 is provided with an axial bore 42. The fiber skirt 20 is in this instance directly attached to collar 40 rather than to another head. For this purpose, a length of twine 44 may be wound around the ends of the fibers, which are placed approximately parallel to the axis of the collar on the outer surface of the collar. The twine 44 is tied to securely hold the skirt. If desired the skirt fibers may be integrally molded in the plastic collar, or may be cemented, glued or otherwise firmly secured to the collar. Thus assembled the skirt and collar 40 are slipped over the hook 14 and along shank 16 to a position near the end of the latter, where there is provided an eye 19 for securement of the fishing line. As illustrated in FIG. 5, the assembled lure provides a skirt surrounding the hook and attached to the collar 40 which replaces the head 12 of FIG. 1, simplifying the structure and lessening the cost of the lure. In slipping the collar 40 over the hook 14 the resiliency of the collar material permits the bore to expand as explained in connection with the collar 30 of FIG. 1.

The lure of FIG. 5, although simpler and more economical than conventional lures, does not include the feature of ability to quickly change the size and appearance, as described for the lure of FIG. 1. To provide this feature, a second and additional collar 50, FIG. 6, of larger outer diameter but formed of similar material and having a similar sized bore, is slipped over the hook 14 to rest on the shank 16 at any desired location. Collar 40 may then be moved by hand along the shank toward collar 50, the latter engaging the inner fibers of the skirt 20 will then flare the skirt outwardly to the condition shown in FIG. 6. The skirt retaining collar 40 may be moved toward the eye 19 of the hook to reduce the diameter of the skirt so that a lure of variable appearance is obtained by the described structure.

Figure 6:
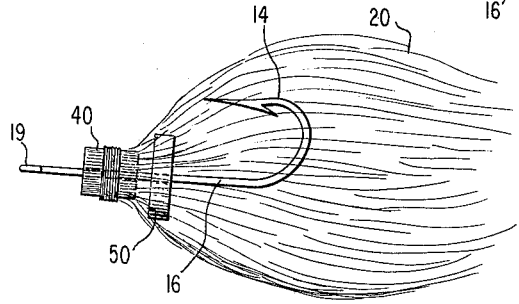
FIG. 6 is a side elevation of another embodiment in which two slideable collars are provided on the shank of the hook, the skirt being attached to one of the collars.

Obviously collar 40 may be left in position near the end of the shank as in FIG. 5 and the larger collar 50 moved by hand toward and away from collar 40 to vary the flare of the skirt, so that the embodiment of FIG. 6 alternatively allows the movement of either collar, or both, to change the appearance of the lure. Whichever collar is left in place is retained frictionally, but if a collar is intended to remain stationary permanently it may be secured by cementing, glueing or any other suitable manner.

It is apparent from the above description that the improved lure is inexpensive to make and easy to use. Changes in color, shape, size and material of the component parts including the collars 30, 40 and 50 may be made without departing from the invention and while still realizing its objects. The described combinations function independently of the dimensions of the hooks, the heads, the skirts, and collars.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:
1. A fish lure comprising a head, a hook having a shank affixed to said head, a tail of fiber-like elements secured at one end to said head and at least partially surrounding the shank, and a member having a transverse dimension greater than that of the secured end of the tail and movably mounted on the shank to engage and vary the spread of said tail.

2. A fish lure comprising a head having means for securing a fishing line thereto, a hook having a shank affixed at one end to said head, a tail of fiber-like elements forming a skirt secured at one end to said head and surrounding the shank, and a friction collar having a transverse dimension greater than that of the secured end of the tail and mounted on the shank and movable therealong to engage and vary the spread of the fiber-like elements of said tail.

3. A fish lure according to claim 2 wherein said collar is formed of a resilient material having a bore closely fitting the shank of the hook so as to frictionally resist movement therealong from a selected position.

4. A fish lure comprising a head, a hook having a shank connected to said head, a tail of fiber-like elements secured at one end to said head and at least partially surrounding the shank, and a collar mounted on the shank between the hook and the head and engageable with said tail, said collar having a transverse dimension greater than the transverse dimension of said tail at its secured end, said head and collar being relatively movable along the shank to vary the spread of said tail.

5. A fish lure according to claim 4 wherein said head is fixed to the shank and said collar is slideable along the shank.

6. A fish lure according to claim 4 wherein said collar is fixed to the shank and the head is slideable along the shank.

7. A fish lure according to claim 6 wherein said head is formed as a collar.

8. A fish lure according to claim 7 wherein said fiber-like elements of the tail are tied about the outer surface of the head.

9. A fish lure comprising a head having means for securing a fishing line thereto, a hook having a shank affixed at one end to said head, a tail of fiber-like elements forming a skirt secured at one end to said head and surrounding the shank, and a collar having an external diameter considerably larger than the inner diameter of the skirt at its point of attachment to the head, said collar being mounted on the shank and movable therealong to engage and vary the spread of the fiber-like elements of said tail, said collar being formed of a resilient material and having a bore closely fitting the shank of the hook so as to frictionally resist movement therealong from a selected position.

References Cited by the Examiner

UNITED STATES PATENTS 2,168,894   8/39   Arbogast _____ 43—42.28 X

SAMUEL KOREN, *Primary Examiner.*